(12) United States Patent
Clausen

(10) Patent No.: US 7,950,743 B2
(45) Date of Patent: May 31, 2011

(54) LEG REST FOR ECONOMY CLASS TRANSPORTATION SEAT

(76) Inventor: Mark Kirgiss Clausen, Milwaukee, WI (US)

( * ) Notice: Subject to any disclaimer, the term of this patent is extended or adjusted under 35 U.S.C. 154(b) by 159 days.

(21) Appl. No.: 12/365,869

(22) Filed: Feb. 4, 2009

(65) Prior Publication Data
US 2009/0195046 A1    Aug. 6, 2009

Related U.S. Application Data

(60) Provisional application No. 61/063,560, filed on Feb. 5, 2008.

(51) Int. Cl.
*A47C 7/50* (2006.01)
(52) U.S. Cl. .............................. 297/423.27; 297/423.28
(58) Field of Classification Search ............. 297/423.27, 297/423.25, 423.26, 423.28, 423.34
See application file for complete search history.

(56) References Cited

U.S. PATENT DOCUMENTS

| | | | | |
|---|---|---|---|---|
| 807,831 | A | * | 12/1905 | Leslie .............................. 296/75 |
| 1,525,864 | A | * | 2/1925 | Hueseman ............... 297/423.27 |
| 1,812,703 | A | * | 6/1931 | Knapp ............................. 296/75 |
| 2,432,072 | A | * | 12/1947 | Trautvetter .............. 297/423.27 |
| 2,472,339 | A | * | 6/1949 | Patton ........................... 297/243 |
| 5,312,155 | A | * | 5/1994 | Akima et al. ............. 297/180.13 |
| 6,352,309 | B1 | | 3/2002 | Beroth |
| 6,375,266 | B1 | * | 4/2002 | Ferguson et al. ......... 297/423.15 |
| 6,527,327 | B2 | * | 3/2003 | Gaus et al. ...................... 296/75 |
| 6,769,739 | B2 | | 8/2004 | Salzer et al. |
| 6,866,341 | B2 | | 3/2005 | Behnert |
| 6,902,238 | B1 | | 6/2005 | Abt et al. |
| 6,916,069 | B2 | | 7/2005 | Bauer et al. |
| 7,055,904 | B2 | | 6/2006 | Skelly et al. |
| 7,073,855 | B2 | | 7/2006 | Wagner et al. |
| 7,111,904 | B2 | | 9/2006 | Dowty et al. |
| 7,195,316 | B2 | | 3/2007 | Shimasaki et al. |

* cited by examiner

*Primary Examiner* — Sarah B McPartlin

(57) ABSTRACT

When stowed, this leg rest lies flat on the floor partially under the passenger's feet and partially under the seat. The leg rest pivots up from the floor to a raised position so that the edge nearest the seat aligns with the front of the seat pan. In its raised position, the leg rest and seat together form a continuous support surface along the entire length of a passenger's body.

10 Claims, 3 Drawing Sheets

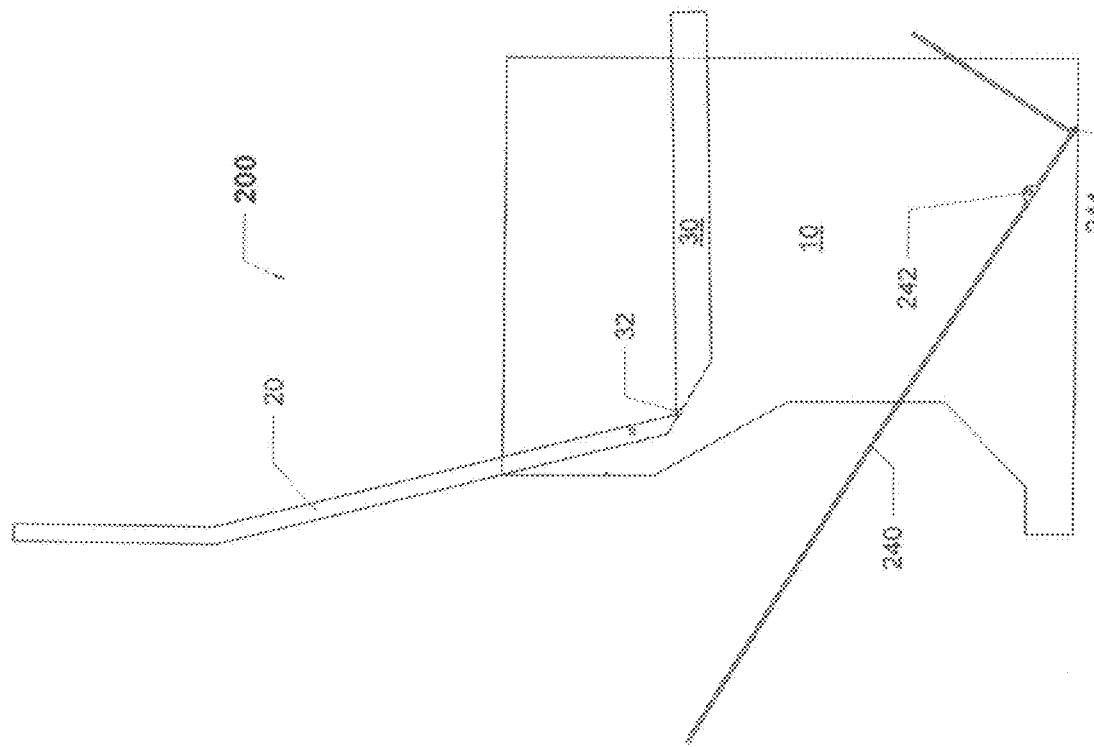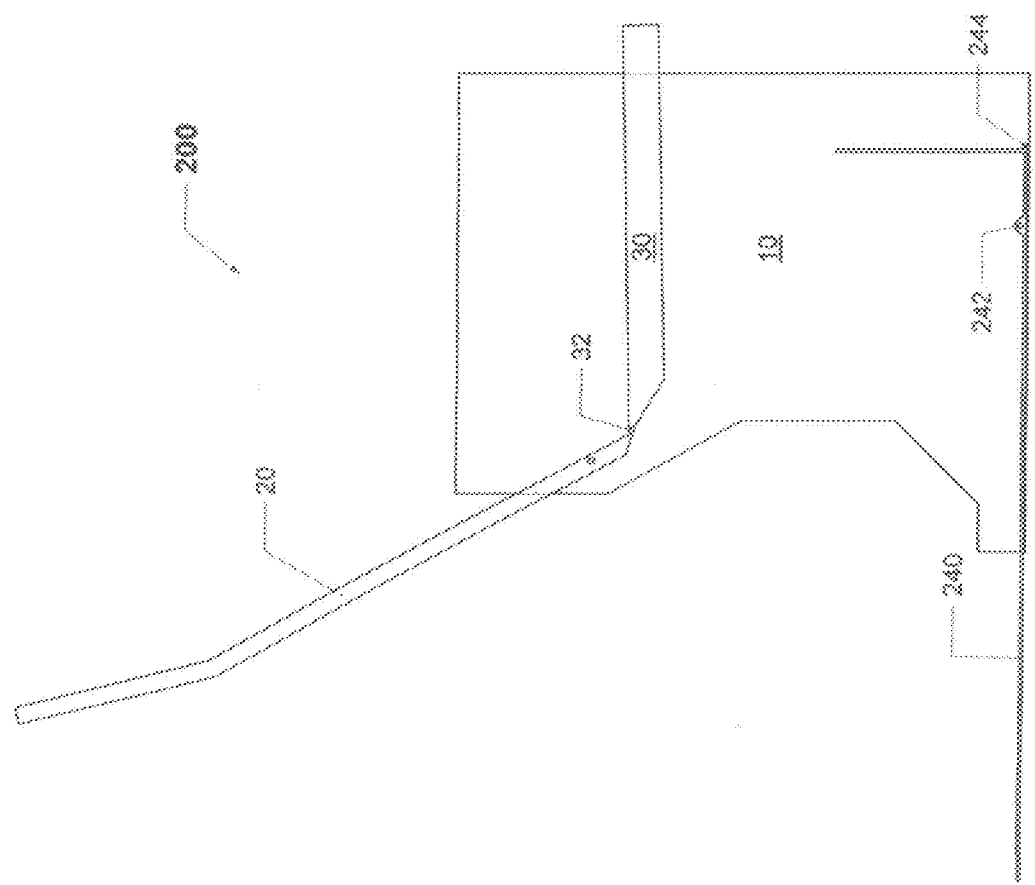
FIG. 2

LEG REST FOR ECONOMY CLASS TRANSPORTATION SEAT

CROSS-REFERENCE TO RELATED APPLICATIONS

This application claims the benefit of provisional patent application 61/063,560 filed Feb. 5, 2008, Inclining Transportation Passenger Seat, by the present inventor.

FEDERALLY SPONSORED RESEARCH

None.

SEQUENCE LISTING OR PROGRAM

None

BACKGROUND OF THE INVENTION

1. Field of the Invention

This invention relates to providing comfortable high-density passenger seating for long duration travel.

2. Prior Art

This invention provides passengers comfortable seating on aircraft or other high passenger density vehicles where minimum passenger space exists and passenger comfort is desirable. When travel durations exceed 3 hours, passenger comfort becomes important. Thus, airline passengers seek seats with more leg-room (by the emergency exit doors) or more shoulder room (on the aisles). For long duration travel, passengers appreciate seating that allows them to change sitting and resting positions. This invention gives a passenger a choice of sitting, reclining, or inclining—all with leg support, providing comfortable positions within a small personal volume. At the same time, this invention provides transportation companies with the high-density seating required for lower fares or higher profits.

Comfortable seating in a short pitch (32 inches spacing between seats or less) environment is difficult. Comfort is increased by maximizing seating positions and the overlap of passenger space. By providing a leg rest, the passenger is supported along his whole body. A foot rest provides a passenger further support.

None of the prior art provides a passenger an inclined position with full body support within the pitch constraint of economy class seating, In reviewing the prior art, one finds that:

- U.S. Pat. No. 7,195,316 B2 to Shimasaki (2007) shows a multi-positional seat with a two-piece sliding seat pan. However, there is no foot rest.
- U.S. Pat. No. 7,111,904 B2 to Dowty (2006) depicts a vehicle seat with a perch position which allows multiple seating postures. In addition, his seat is designed for tourist/coach class. In this invention, the seat pan slides forward and the seat back slides down. There is no leg rest. The seat back does not impinge on the space of the rear passenger.
- U.S. Pat. No. 7,073,855 B2 to Wagner (2006) describes a vehicle seat with adjustable components within a spatial restraint. This seat allows passengers to recline almost horizontally. However, the seat pitch is greater than 32 inches, and the leg rest is not stowed on the floor.
- U.S. Pat. No. 7,055,004 B2 to Skelly (2006) reveals a seat adapted for sleeping. In this design the seat bottom may be rotated so that a passenger's hips are not at the same height, providing one to change sleeping positions. The design is similar to Dowty (2006). There is no leg rest.
- U.S. Pat. No. 6,916,069 B2 to Bauer (2005) reveals a reclining seat with a leg rest. The seat inclines and allows a passenger to assume numerous positions. However, the seat has no leg support and requires a pitch greater than 32 inches. The seat is designed for first class passengers.
- U.S. Pat. No. 6,902,238 B1 to Abt (2005) depicts an adjustable aircraft seat with a foot and leg rest. However, the leg rest is not stowed on the floor, and the seat does not allow one to incline.
- U.S. Pat. No. 6,866,341 B2 to Behnert (2005) shows a vehicle seat which slightly reclines and provides elevation for the knees. It has a combined leg rest and foot rest. The leg rest is not stowed on the floor, and the seat does not incline.
- U.S. Pat. No. 6,769,739 B2 to Salzer (2004) reveals a vehicle seat that allows a passenger to fully incline. The leg rest is attached to the seat pan. Salzer's design pertains to business class or higher. His seat does not meet the 32 inch pitch requirement for economy seating. In the inclined position, his seat does not impinge on the space of the rear passenger.
- U.S. Pat. No. 6,353,309 B1 to Beroth (2002) describes a passenger seat designed for sleeping. The seat inclines and has an ottoman for leg support. The leg rest is not stowed on the floor, and the pitch is greater than 32 inches. In its inclined position, Beroth's seat does not impinge on the space of the rear passenger.

SUMMARY

In accordance with one embodiment of this invention, a passenger seat provides a fully upright, a reclining, and an inclining position. A foot rest and a leg rest are available to complete support of all parts of a passenger's body. The leg rest is stowed on the floor; the foot rest is mounted under the forward seat. Although seating space is constricted, passenger space (and, therefore, comfort) is maximized.

BRIEF DESCRIPTION OF THE DRAWINGS

Figures

The reader may best appreciate this invention by reviewing FIGS. 1 through 3. Note, in all cases the figures depict a simplified cross-sectional schematic diagram showing the seat in various positions.

FIG. 2 depicts a second embodiment of the present invention with a fixed seat pan and a reclining back rest.

DRAWINGS

Reference Numerals

Figure 1:
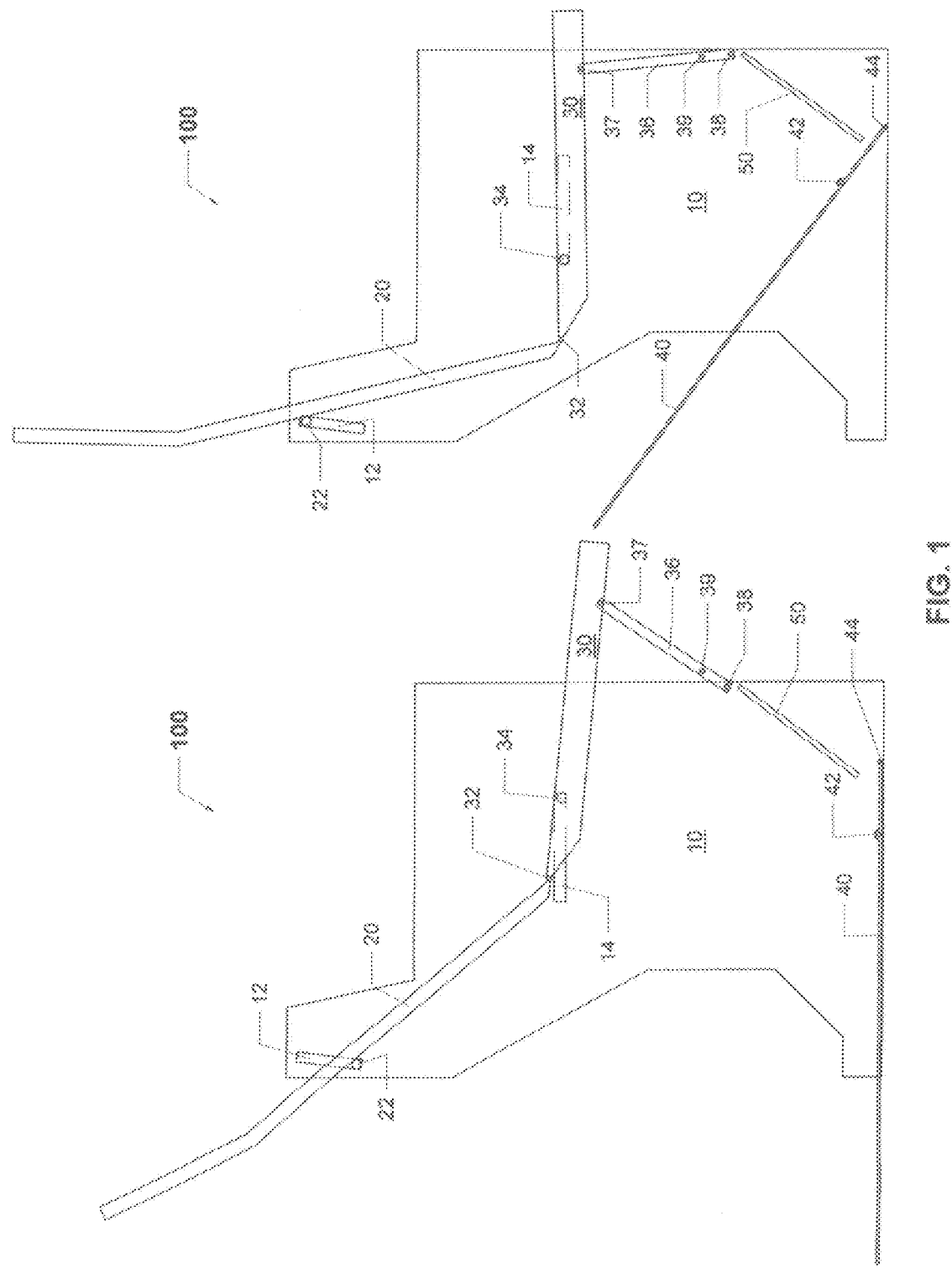
FIG. 1 is the preferred embodiment of this invention. It shows a passenger seat which incorporates a foot rest, a leg rest a sliding seat pan, and an inclining back rest.

10 - frame
12 - upper frame track
14 - lower frame track

-continued

20 - back rest
22 - back rest slide/pivot
30 - seat pan
32 - seat pan/back rest pivot
34 - seat pan slide/pivot
36 - front seat pan support
37 - front seat pan support upper pivot point
38 - front seat pan support lower pivot point
39 - seat pan actuator attachment point
40 - leg rest
42 - leg rest actuator attachment point
44 - leg rest pivot
50 - foot rest
100 - multi-positional seat
200 - multi-positional seat
240 - leg/foot rest
242 - leg rest actuator attachment point
244 - leg rest pivot
300 - multi-positional seat
335 - forward seat pan slide/pivot

DETAILED DESCRIPTION OF THE PREFERRED EMBODIMENTS

FIG. 1 depicts a simplified cross-sectional schematic diagram of a fully inclined transportation seat 100, shown as a primary seat, and a fully upright seat 100, shown as a forward seat. The seat 100 comprises a frame 10, a back rest 20, a seat pan 30, a leg rest 40 and a foot rest 50. A seat pan slide/pivot 34 moves along a lower frame track 14 and secures seat pan 30 to the frame 10. Similarly, a back rest slide/pivot 22 moves along an upper frame track 12 to secure back rest 20 to frame 10. In addition, a seat pan/back rest pivot 32, not secured to frame 10, allows the angle between seat pan 30 and back rest 20 to range between approximately 90° to approximately 140°, allowing the seat to recline and incline, thus, providing a passenger innumerable seating and resting positions.

A passenger may shift the position of the seat to any of the plurality of different positions between the fully upright and fully inclined selections. For example, the user can shift the seat pan 30 and the lower part of the back rest 20 horizontally to move into a reclining position. By moving the seat pan 30 further horizontally, the user moves the seat to the fully inclined position. As seen in FIG. 1, back rest 20 rotates around the back rest slide/pivot 22 while guided along an upper frame track 12, and seat pan 30 rotates around a seat-pan slide/pivot 34 while guided along a lower frame track 14. Frame 10 moveably secures the back rest 20 at back rest slide/pivot 22. Frame 10 also moveably secures the seat pan 30 at seat-pan slide/pivot 34 as seat pan 30 travels along lower frame track 14. The seat pan/back rest pivot 32 allows the angle between back rest 20 and seat pan 30 to change as the seat pan 30 moves horizontally. When the seat-pan slide/pivot 34 reaches the forward end of lower frame track 14, the seat is fully inclined.

Seat 100 further comprises a front seat pan support 36, a front seat pan support upper pivot point 37, a front seat pan support lower pivot point 38, and a seat pan actuator attachment point 39.

Seat pan 30 is rotatably attached to the front seat pan support 36 at the front seat pan support upper pivot point 37. As the seat pan 30 moves forward, the front seat pan support 36 rotates around the front seat pan support lower pivot point 38, which is attached to frame 10. The seat pan actuator attachment point 39 is attached to an actuator (not shown) which allows adjustment of the positions of seat pan 30 and back rest 20.

FIG. 1 further shows a foot rest 50 and leg rest 40. While the foot rest 50 keeps a person from sliding down the seat, the leg rest 40 supports the legs, completing the support for a passenger's entire body. With the entire body supported, a passenger finds it easier to relax and/or sleep.

As seen in FIG. 1, the user of the primary seat finds a foot rest 50 under the forward seat. The foot rest 50 is secured close to the front of frame 10 of the forward seat. Foot rest 50 has a foot support surface that faces the primary seat. Leg rests 40 are depicted in FIG. 1 in the stowed position under the primary seat and in the raised position under the forward seat. Foot rest 50 and leg rest 40 work independently; thus, one may use foot rest 50 without placing leg rest 40 in its raised position. In cases where there is no forward seat frame, the foot rest 50 and the leg rest 40 could be secured to a similar forward frame or to the floor.

The passenger in the primary seat finds leg rest 40 mounted under the forward seat, stowed on the floor beneath his feet when not in use. Frame 10 rotatably connects leg rest 40 at a leg rest pivot 44. Leg rest 40 incorporates a leg rest actuator attachment point 42. The leg rest actuator attachment point 42 catches an actuator (not shown) in the form of, for example, a pneumatic or hydraulic working cylinder or an electro-mechanical actuating drive which, when activated, can be used to adjust the tilt of the leg rest 40. The actuator allows the leg rest 40 to move between its stowed and raised positions. When in its raised position, leg rest 40 and the foot support surface form an approximate right angle.

To move from a stowed to a raised position, leg rest 40 rotates about leg rest pivot 44. With primary seat 100 in the inclined position and leg rest 40 under the forward seat in its raised position, the rear edge of leg rest 40 aligns with the front of seat pan 30. Together, the inclined seat 100 and the raised leg rest 40 form an approximately continuous and relatively flat surface for a passenger to rest.

FIG. 2 depicts a simplified cross-sectional schematic diagram of a reclineable transportation seat 200, which closely resembles seats currently in use. The seat 200 comprises a frame 10, a back rest 20, a seat pan 30, and a leg/foot rest 240. Seat pan 30 is secured to frame 10. A seat pan/back rest pivot 32 allows the angle between seat pan 30 and back rest 20 to vary, allowing the seat to recline in a manner similar to current passenger seats.

FIG. 2 shows a primary seat in a reclined position and a forward seat in an upright position and reveals the leg/foot rest 240. The leg/foot rest 240 supports both legs and feet, completing the support of the passenger's entire body.

FIG. 2 shows the leg/foot rest 240 under the primary seat in its stowed position and under the forward seat in its raised position. Frame 10 rotatably connects leg/foot rest 240 at the leg rest pivot 244. The leg/foot rest 240 incorporates a leg rest actuator attachment point 242. The leg rest actuator attachment point 242 catches an actuator (not shown) which, when activated, can be used to allow adjustment of the tilt of leg/foot rest 240. The actuator allows the leg/foot rest 240 to move between its stowed and raised positions.

To move from the stowed to a raised position, leg/foot rest 240 rotates about the leg rest pivot 244. In its raised position the rear edge of the leg/foot rest 240 under the forward seat aligns with the front of the primary seat pan 30, forming an approximately continuous and relatively flat surface to support a passenger's legs. The back rest 20 moves between the fully upright and reclined positions using actuators or similar devices found in current economy passenger seats.

Figure 3:
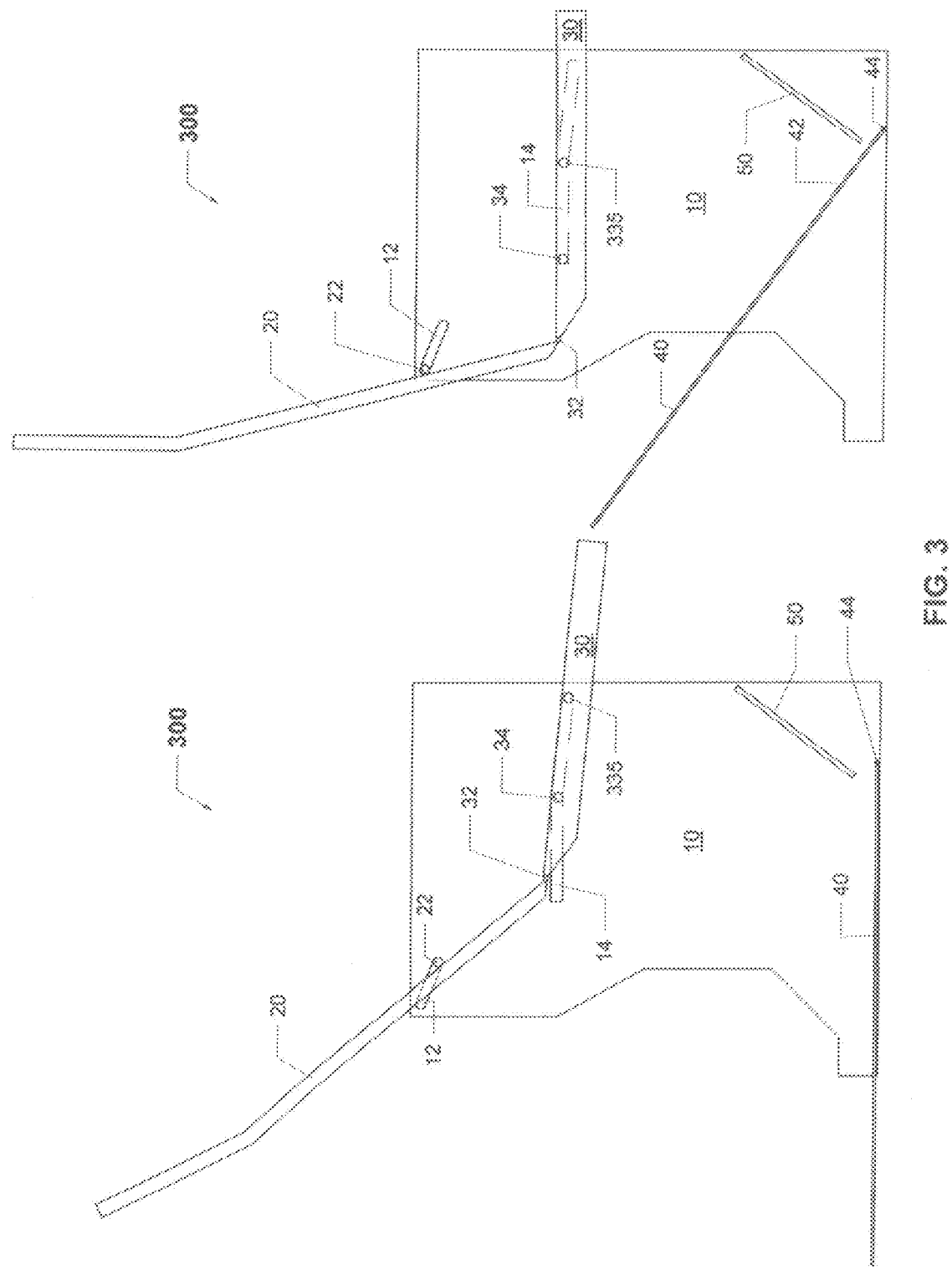
FIG. 3 depicts a third embodiment of this invention using a standard transportation seat frame with a sliding seat pan and inclining back rest.

FIG. 3 depicts another embodiment of the transportation seat. This embodiment is similar to the embodiment of FIG. 1 but consists of components that are similar to those used in conventional transportation seats.

FIG. 3 shows a simplified cross-sectional schematic diagram of a fully inclined transportation seat 300, shown as a primary seat, and a fully upright seat, shown as a forward seat. The seat 300 comprises a frame 10, a back rest 20, a seat pan 30, a leg rest 40 and a foot rest 50. Seat pan slide/pivot 34 and forward seat pan slide/pivot 335 move along a lower frame track 14 and secure seat pan 30 to the frame 10. Similarly, a back rest slide/pivot 22 moves along an upper frame track 12 to secure back rest 20 to frame 10. In addition, a seat pan/back rest pivot 32, not secured to frame 10, allows the angle between seat pan 30 and back rest 20 to range between approximately 90° to approximately 140°, allowing the seat to recline and incline, thus, providing a passenger innumerable seating and resting positions.

A passenger may shift the position of the primary seat to any of the plurality of different positions between the fully upright and fully inclined selections. For example, the user can shift the seat pan 30 and the lower part of the back rest 20 horizontally to move into a reclining position. By moving the seat pan 30 further horizontally, the user moves the seat to the fully inclined position. As seen in FIG. 3, back rest 20 rotates around the back rest slide/pivot 22 while guided along an upper frame track 12, and seat pan 30 rotates around a seat-pan slide/pivot 34 and forward seat pan slide/pivot 335 while guided along a lower frame track 14. Frame 10 moveably secures the back rest 20 at back rest slide/pivot 22. Frame 10 also moveably secures the seat pan 30 at seat-pan slide/pivot 34 and forward seat pan slide/pivot 335 as seat pan 30 travels along lower frame track 14. The seat pan/back rest pivot 32 allows the angle between back rest 20 and seat pan 30 to change as the seat pan 30 moves horizontally. When the forward seat-pan slide/pivot 335 contacts the forward end of lower frame track 14, the seat is fully inclined. When the seat-pan slide/pivot 34 contacts the back end of lower frame track 14, the end nearest the back rest, the seat is fully upright. The position of the seat pan 30 may be controlled using an actuator (not shown) attached to the seat pan 30 (or back rest 20) and frame 10 in a manner similar to that used in current economy class seats.

FIG. 3 further shows a foot rest 50 and leg rest 40. While the foot rest 50 keeps a person from sliding down the seat when the seat is in the fully inclined position, the leg rest 40 supports the legs, completing the support for a passenger's entire body. With the entire body supported, a passenger finds it easier to relax and/or sleep.

As seen in FIG. 3, the user of the primary seat finds foot rest 50 under the forward seat. FIG. 3 shows leg rest 40 in its two positions—under the primary seat (in its stowed position) and under the forward seat (in its raised position). Foot rest 50 and leg rest 40 work independently; thus, one may use foot rest 50 without placing leg rest 40 in its raised position.

When not in use, leg rest 40 for the primary seat passenger is stowed on the floor between the primary seat and the forward seat and under the forward seat. Frame 10 rotatably connects leg rest 40 at the leg rest pivot 44. To move from the stowed to a raised position, leg rest 40 rotates about leg rest pivot 44. With primary seat 300 in the inclined position and the leg rest 40 under the forward seat in its raised position, the rear edge of leg rest 40 aligns with the front portion of seat pan 30. Together, the inclined seat 300 and the raised leg rest 40 form an approximately continuous and relatively flat surface for a passenger to rest.

Although not shown, an actuator can be used to allow adjustment of the tilt of the leg rest 40. The actuator allows leg rest 40 to move between its stowed and raised positions. For simplicity, instead of an actuator, a latch could catch the leg rest as it is raised manually, holding it in its raised position until the latch is released.

Advantages:

This passenger seat provides:
1. High density comfortable seating with a pitch of approximately 32 inches.
2. An inclining position in addition to fully upright and reclining positions.
3. An extended leg rest to provide full body support.
4. A foot rest to provide support, especially in an inclining position.
5. A leg rest, which when stowed, does not impinge on a passenger's personal space.
6. A leg rest which, in its raised position, allows a passenger to utilize much of the space under the forward seat and has a larger support surface than those described in the prior art.
7. An inclined position where seats maximize overlap between passengers, allowing a greater horizontal slope for resting.

Variations:

Many different combinations of tracks, slide/pivot points, and support points can be used to guide the motion of the back rest and seat pan as it moves between the fully upright, reclined, and inclined positions.

The leg rest can have a multiplicity of positions to enhance a passenger's comfort. For example, a passenger may choose to raise his knees by using the rear edge of the leg rest.

I claim:

1. A transportation seat sitting on a floor in a vehicle, comprising:
   (a) a primary seat, further comprising:
      (i) a frame;
      (ii) a seat pan moveably secured with the frame such that the seat pan moves generally horizontally relative to the frame;
      (iii) a back rest; wherein the back rest is pivotally secured within an upper frame track at a first pivot point with the frame and wherein a lower end of the back rest proximate the seat pan, pivots in a first direction toward the seat pan and an upper portion of the back rest distal from the seat pan moves in a second direction opposite the first direction such that movement of the seat pan causes a change in angle between the back rest and the seat pan; wherein said seat pan has a frontal portion that is positioned distal from the back rest;
   (b) a leg rest positioned forward of the primary seat, said leg rest having a planar support surface that contacts passenger's legs, and said planar support having a distal portion positioned away from said primary seat and a proximal portion positioned toward said primary seat wherein the distal portion is pivotally secured to leg rest pivot adjacent to the floor, and wherein said leg rest can move between a stowed and a fully raised position and when, in said stowed position, said planar support surface is parallel to floor and when, in its fully raised position, said proximal portion of said leg rest approximately aligns with said frontal portion of said seat pan of said primary seat, whereby the seat and leg rest together form a continuously supportive surface for the entire length of the passenger's body.

2. A transportation seat according to claim 1, further comprising a foot rest wherein said foot rest has a support surface that forms an approximate right angle with said leg rest when leg rest is in its fully raised position and further where said foot rest is secured to a forward frame of a secondary forward seat.

3. A transportation seat according to claim 1, further comprising a foot rest wherein said foot rest has a support surface that forms an approximate right angle with said leg rest and is secured to said distal portion of said leg rest.

4. The transportation seat of claim 1 wherein said leg rest is a single planar element.

5. The leg rest of claim 1 wherein said leg rest in both its stowed and fully raised positions has said distal portion positioned beneath a forward seat and said proximal portion positioned adjacent a forward edge of the primary seat.

6. An transportation seat sitting on a floor in a vehicle comprising:
  (a) a primary seat, further comprising:
    (i) a frame;
    (ii) a seat pan secured with the frame;
    (iii) a back rest; wherein the back rest is pivotally secured at a fixed pivot point located on a lower portion of the back rest proximate the seat pan such that movement of the back rest causes a change in an angle between the back rest and the seat pan; wherein said seat pan has a frontal portion that is positioned away from the back rest;
  (b) a leg rest positioned forward of the primary seat, said leg rest having a planar support surface that contacts passenger's legs, and said planar support having a distal portion positioned away from said primary seat and a proximal portion positioned toward said primary seat wherein the distal portion is pivotally secured to leg rest pivot adjacent to the floor, and wherein said leg rest can move between a stowed and a fully raised position, and when, in said stowed position, said planar support surface is parallel to floor and when, in its fully raised position, said proximal portion of said leg rest approximately aligns with said frontal portion of said seat pan of said primary seat, whereby the seat and leg rest together form a continuously supportive surface for the entire length of the passenger's body.

7. A transportation seat according to claim 6, further comprising a foot rest wherein said foot rest has a support surface that forms an approximate right angle with said leg rest when said leg rest is in its fully raised position and further where said foot rest is secured to a forward frame of a secondary forward seat.

8. A transportation seat according to claim 6, further comprising a foot rest wherein said foot rest has a support surface that forms an approximate right angle with said leg rest and is secured to said distal portion of said leg rest.

9. The transportation seat of claim 6 wherein said leg rest is a single planar element.

10. The leg rest of claim 6 wherein said leg rest in both its stowed and fully raised positions has said distal portion positioned beneath a forward seat and said proximal portion positioned adjacent a forward edge of the primary seat.

* * * * *